United States Patent Office 3,506,480
Patented Apr. 14, 1970

3,506,480
OIL FILTER PAPER AND PROCESS OF PREPARING SAME
Lowell E. Peterson, Minneapolis, and Lyle F. Elmquist, North St. Paul, Minn., assignors to General Mills, Inc., a corporation of Delaware
No Drawing. Continuation of application Ser. No. 603,743, Dec. 22, 1966. This application Feb. 24, 1969, Ser. No. 801,860
Int. Cl. B21h 1/28, 1/34
U.S. Cl. 117—155                13 Claims

---

ABSTRACT OF THE DISCLOSURE

Oil filter paper is prepared by impregnating the paper with both a thermosetting phenol-formaldehyde resin and a polyisocyanate or combination of a polyisocyanate and a polyamine, such polyisocyanate having the formula

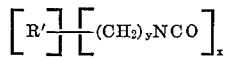

where $y$ is 0 or 1, $x$ is an integer of 2 to about 4 and $R'$ is the hydrocarbon group of polymeric fat acids. The impregnated paper is cured.

---

This application is a continuation of our application Ser. No. 603,743, filed Dec. 22, 1966, and now abandoned.

The present invention relates to an improved oil filter paper for the filtration of liquid hydrocarbons and to the process of preparing same. More particularly, it relates to filter paper impregnated with a phenol-formaldehyde resin and certain polyisocyanates and/or the polyurea derivatives of such polyisocyanates and to the process of making such paper.

The paper now used in many commercially available oil filter elements is impregnated with a phenol-formaldehyde resin to provide wet strength. Under normal use conditions, the filter paper often comes in contact with water. The water wets the impregnated paper causing a strength loss of the paper. Such loss of strength may cause the filter element to fail.

Therefore, it is an object of our invention to provide an improved oil filter paper for the filtration of liquid hydrocarbons. Another object of the invention is to provide an oil filter paper which has good wet strength and water repellency. A further object is to provide a process of preparing such improved oil filter paper. These and other objects will become apparent from the following detailed description.

We have now discovered that phenol-formaldehyde treated filter paper can be substantially improved if the filter paper is also treated with a polyisocyanate derived from polymeric fat acids and/or the polyurea derivatives of such polyisocyanate. The filter paper of the present invention is readily wet by liquid hydrocarbons such as mineral oil but is highly water repellent. Thus filter elements using such paper continue to perform under conditions where the previously available paper would lose strength and sometimes fail completely.

The polyisocyanates employed in the present invention have the following idealized, structural formula:

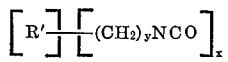

where $y$ is 0 or 1, $x$ is an integer of 2 to about 4 and $R'$ is the hydrocarbon group of polymeric fat acids. Preferably, $x$ is 2.

The polyisocyanates wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. This method of preparation can be conveniently illustrated by the following equations (using a dimeric fat acid as an example):

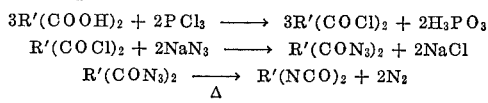

The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates. This method of preparation can be conveniently illustrated by the following equations (using a dimeric fat acid as an example)

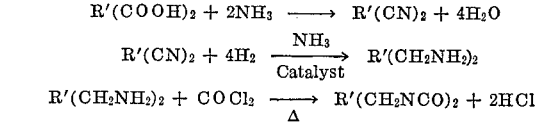

The polymeric fat acids, useful as the starting materials for preparing the polyisocyanates, are prepared by polymerizing a fat acid. The term "fat acid" as used herein refers to naturally occurring and synthetic monobasic aliphatic acids having hydrocarbon chains of 8–24 carbon atoms. The term "fat acid," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize, but polymerization can be obtained at elevated temperatures with a peroxidic reagent such as di-t-butyl peroxide. Because of the low yields of polymeric products, these materials are not commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or noncatalytic polymerization techniques can be employed. The noncatalytic polymerization generally requires a higher temperature. Suitable agents for the polymerization include acid or alkaline clays, di-t-butyl peroxide, boron trifluoride and other Lewis acids, anthraquinone, sulfur dioxide and the like. Suitable monomers include the branched and straight chain, poly- and monoethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic aid, linoleic acid, linolenic acid, eleostearic acid, hiragonic acid, moroctic acid, timnodonic acid, eicosatetraenoic acid, nisinic acid, scoliodonic acid and chaulmoogric acid.

Acetylenically unsaturated fat acids, such as isanic and isanolic acids, can also be polymerized to give polymeric acids which can be used. The acetylenically unsaturated acids occur only rarely in nature and are expensive to synthesize. Therefore, they are not currently of commercial significance.

Although any one of the above-described saturated, ethylenically unsaturated and acetylenically unsaturated fat acids may be used to prepare the polymeric fat acids, it is generally the practice in the art to polymerize mixtures of acids (or the simple aliphatic alcohol esters—i.e., the methyl esters) derived from the naturally occurring drying and semidrying oils. Suitable drying and semi-drying oils include soybean, linseed, tall, tung, perilla, oiticica, cottonseed, corn, sunflower, dehydrated castor oil and the like. Also the most readily available acids are oleic and linoleic and thus they are preferred starting materials for the preparation of the polymeric fat acids. It is preferred to employ as starting materials in the preparation of the polyisocyanates, relatively pure dimerized fat acids. Such acids can be obtained from mixtures containing monomer, the dimerized fat acids, trimerized fat acids and higher polymers by high vacuum distillation or solvent extraction. The use of relatively pure dimerized fat acids as a starting material is advantageous where a diisocyanate of high purity is desired. Of course, mixtures of the polymerized fat acids can also be used to prepare mixtures of polyisocyanates. Any of the described unsaturated polymeric fat acids can be hydrogenated prior to the use thereof in the polyisocyanate preparation.

The following examples illustrate the preparation of the polyisocyanates useful in the present invention.

EXAMPLE A

In a 1-liter, round-bottom flask equipped with a reflux condenser protected by a calcium chloride drying tube were placed 200 g. of purified dimerized fat acid dissolved in 200 ml. of Skellysolve B and 65 g. of phosphorus trichloride. The dimerized fat acid was derived from the mixture of acids in tall oil and consisted mainly of dimerized linoleic and oleic acids. It had the following properties: wt. percent dimerized fat acid—99; wt. percent monomer—0.5; neut. equiv.—286; and sap. equiv.—280. The reaction mixture was heated under reflux for 2 hours and then allowed to stand overnight. The clear solution of the dimerized fat acid chloride was decanted from the heavy phosphorus acid. The solvent and excess phosphorus trichloride were removed under reduced pressure.

Into a 1-liter reaction flask equipped with cooling coils, stirrer and thermocouple was placed a solution of 30.4 g. sodium azide in 125 ml. water cooled to 10° C. To this rapidly stirred solution was added a solution of 100 g. of the dimerized fat acid chloride dissolved in 150 ml. of acetone. The reaction temperature was controlled at 10–15° C. during the addition and during a 1-hour period following addition, after which 200 ml. of heptane was added. The heptane layer was separated, washed with 2 portions of cold water, and then dried over magnesium sulfate. To 200 ml. heptane maintained at 65–70° C. was added the above dried heptane solution of the dimerized fat acyl azide. The solution was maintained at a temperature of 65–70° C. for 1 hour and then the heptane was evaporated at reduced pressure. There was obtained 70 g. liquid diisocyanate having the following formula:

OCN—D—NCO where D is the dimeric fat radical derived from the starting dimerized fat acids.

EXAMPLE B

The preparation as described in Example A was repeated except that the dimerized fat acid chloride (94 g.) was dissolved in 140 ml. of heptane instead of acetone. There was obtained 63 g. of the diisocyanate.

EXAMPLE C

The preparation as described in Example A was repeated except that 213 g. of the dimerized fat acid chloride was dissolved in 300 ml. acetone. There was obtained 177 g. of the diisocyanate.

EXAMPLE D

Two hundred forty grams of phosgene (2.42 mole) were dissolved in 700 ml. of dry toluene with cooling in an ice bath to maintain the solution temperature below 5° C. The phosgene solution was then placed in a 2-liter, 3-neck flask equipped with a Dry Ice condenser, a stirrer and a funnel. A solution of 164.4 g. double distilled dimer amine (0.6 eq.) in 200 ml. toluene was placed in the funnel. The diamine was prepared by hydrogenating a dimer nitrile in the presence of ammonia and methanol-wet Raney nickel catalyst. The dimer nitrile was prepared from a dimerized fat acid derived from the mixture of acids in tall oil which acid consisted mainly of dimerized linoleic and oleic acids. The dimer amine had the following properties: wt. percent monomer—0.5; wt. percent dimer—98.5; wt. percent trimer—1.0; and neut. equiv.—271.

The flask was warmed by using a heating mantle until a heavy reflux of phosgene was observed (40–50° C.). The dimer amine solution was then added slowly over a 1-hour period. After the addition was complete, the reaction mixture was refluxed for an additional 2 hours. The Dry Ice condenser was replaced with a water condenser and the temperature of the solution was raised slowly until the toluene began to reflux. The refluxing was continued for 6 hours after which the heating was discontinued and the solution allowed to cool to room temperature. The toluene was then removed under reduced pressure. There was obtained 181.4 g. of diisocyanate having the formula

OCN—CH$_2$—D—CH$_2$—NCO where D is the dimeric fat radical derived from the starting dimerized fat acid. The diisocyanate was a light brown, oily liquid.

EXAMPLE E

The procedure of Example D was repeated except that the dimer acid was hydrogenated prior to being converted to the dinitrile. There was obtained 179 g. of saturated diisocyanate which had substantially the same properties as the diisocyanate of Example D but was lighter in color.

As indicated above, the polyurea derivatives of the described polyisocyanates can also be used in the preparation of the improved oil filter paper. Any polyamine containing at least two active hydrogens can be used with the said polyisocyanates to provide the polyurea polymers. The preferred polyamines are the alkylene polyamines and the substituted alkylene polyamines. The especially preferred polyamines are selected from those having the following formulae:

H$_2$NRNH$_2$
and
H$_2$N(RNH)$_n$RNH$_2$ where R is a difunctional aliphatic group containing from 2 to about 48 carbon atoms and $n$ is an integer of 1 to about 20. R may represent the same or different radicals in any one polyamine compound. Where the said polyamines contain secondary amine groups, one or more of said groups may have the hydrogen replaced by an aliphatic group, such as an aliphatic hydrocarbon group of 1 to about 24 carbon atoms—i.e. methyl, propyl, butyl, decyl, hexadecyl, hexenyl, octenyl, tridecenyl, octadecyl, undecynyl and the like. Inert or noninterfering groups such as Cl, nitro and the like may be present on the group R or the described substituent replacing the hydrogen of one or more secondary amine groups.

Especially preferred polyamines are those having the formula as set forth above wherein R is an aliphatic hydrocarbon group and $n$ is 1 to 3. It is still more preferred that R is an alkylene group of 2–6 carbon atoms. Typical of the amines which may be used are ethylene diamine, diethylene triamine, triethylene tetramine, etc., and the corresponding propylene, butylene, etc., amine.

The primary amine groups of the polyamine compounds may be converted to aldimines or ketimines by reaction with a carbonyl compound. Such carbonyl compound may have the following structural formula

wherein $R_1$ and $R_2$ are hydrogen or organic radicals and are each substantially inert to the ketimine or aldimine formation reaction. At least one of such radicals must be an organic group. Preferably, $R_1$ and $R_2$, when organic, are short chain alkyl groups (1 to 4 carbon atoms). The reaction of the primary amine groups with the carbonyl compound yields the following group:

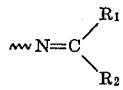

The primary amine group is again formed upon addition of water (i.e., atmospheric moisture). Accordingly, preferred carbonyl compounds are low molecular weight ($C_2$–$C_6$) aldheydes or ketones that are volatile so that an unreacted excess thereof may easily be removed by convention distillation practices when the reaction is completed and so that when the resulting derivatives are mixed with the polyisocyanates and exposed to water, the freed aldehyde or ketone can be easily removed from the reaction mixture.

Preferred examples of the carbonyl compounds include such aldehydes and ketones as acetone, methylethyl ketone, diethyl ketone, methylpropyl ketone, methylisopropyl ketone, methylisobutyl ketone, methyl-n-butyl ketone, ethylisopropyl ketone, acetaldehyde, propionaldehyde, butyraldehyde, isobutyraldehyde and the like.

Any of a wide variety of phenl-formaldehyde thermosetting resins may be employed in the practice of the present invention. Such resins are prepared by reacting a phenol with an excess of formaldehyde in the presence of a basic or acidic catalyst and terminating the reaction at the A-stage (resin still soluble in alcohols— i.e., ethyl alcohol). Phenol is the preferred reactant although various alkylated phenols may also be used— cresols, xylenols and the like. Formaldehyde may be replaced by paraformaldehyde, trioxan, methylol, etc., which yield formaldehyde during the condensation reaction. The ratio of formaldehyde to phenol should be above 1:1 to 10:1 and higher. Good results are obtained at a ratio of 1.5:1.

Any available filter paper can be treated in accordance with the present invention. Many such papers are commercially available and are often derived from 100% cotton linters.

The treated paper can be prepared in a variety of ways. Thus a portion of the phenol-formaldehyde resin can be added in the beater and the remainder added to the formed filter paper. Or the thermosetting resin can be added completely to the already formed paper. In either of the above, the phenol-formaldehyde resin can then be cured by application of heat prior to the addition of the polyisocyanate or the combination of the polyisocyanate and the polyamine. Of course, the polyisocyanate or the polyisocyanate-polyamine combination can be added to the phenol-formaldehyde resin impregnated filter paper prior to the curing of the resin. Additionally, the polyisocyanate or the polyisocyanate-polyamine combination can be added to the untreated paper and then the phenol-formaldehyde resin can be added followed by the heat curing step.

The phenol-formaldehyde resin is preferably applied to the filter paper from an alcoholic solvent solution. Ethyl alcohol is one preferred solvent. The said resin is applied in an amount sufficient to substantially increase the wet strength of the paper. Preferably, the resin is used in an amount of about 5 to 40% by weight based on the dry weight of the paper.

The polyisocyanate is preferably applied to the filter paper from an organic solvent solution or from a water emulsion. One preferred solvent is mineral spirits. The polyisocyanate derived from the polymeric fat acids is very slowly reactive toward water and, accordingly, there is no great loss of isocyanate groups in the limited period of time that the aqueous emulsion is formed and applied to the filter paper. The polyisocyanate is used in an amount sufficient to substantially increase the water repellency of the filter paper. Preferably the polyisocyanate will be used in an amount of about 0.5 to 25% by weight of the dry filter paper. Amounts much above about 5% are usually not needed since excellent water repellency is provided at the lower levels.

Where the polyisocyanate is used in combination with the polyamine, the same are preferably applied sequentially from solvent solutions such as mineral spirits solutions. The polyurea polymer is accordingly formed on the filter paper through reaction of the polyisocyanate and the polyamine. However, when the primary amine groups of the polyamine are blocked by ketimine or aldemine groups as above described, a single solvent solution may be used in the absence of significant amounts of water. After application, the filter paper is exposed to moisture which unblocks the primary amine groups and the polyurea polymer is again formed in situ on the filter paper. The polyamine may be employed in varying amounts in regard to the polyisocyanate. Thus the polyamine:polyisocyanate weight ratio is preferably in the range of 5:100 to 100:5. Of course the polyurea polymer formed in situ is present in an amount sufficient to substantially increase the water repellency of the filter paper. Amounts of 0.5 to 25% by weight are preferred.

The paper impregnated with the phenol-formaldehyde resin is heated to cure said resin. Curing temperatures of 125–250° C. are preferred. The action of the polyisocyanate is not completely understood. Thus it may react with active groups of the paper such as cellulosic hydroxyl groups. It may also react with water to produce a polyurea polymer in situ on the paper. Or the action may be merely physical in nature. Regardless of the nature of the action, the curing the the polyisocyanate impregnated paper can be carried out at room temperature and lower but such curing is accelerated at higher temperatures. The curing of the polyisocyanate-polyamine combination can be carried out by merely bringing the paper into contact with both the polyisocyanate and the polyamine. Of course, temperatures above room temperature accelerate the said reaction.

The filter paper treated in accordance with the present invention is especially useful for filtration of liquid hydrocarbons such as gasoline, mineral oil, kerosene, dry cleaning fluids and the like.

The following specific description further illustrates the invention.

EXAMPLE I

A 0.5% by weight solution of the polyisocyanate as pepared in Example E above in mineral spirits is applied (by dipping) to untreated filter paper (100% cotton linters). The paper is then dried at 100° C. for 15 minutes to give a pickup on the paper of about 1.3% of the polyisocyanate. The paper is then dipped into a 16% by weight ethyl alcohol solution of a thermosetting phenol-formaldehyde resin. The resin pick-up on the paper is about 22% based on the dry weight of the paper. The impregnated paper is then cured by heating same in an oven at 150° C. for 15 minutes. The resulting treated paper is readily wet by mineral oil but does not wet to any appreciable extent when soaked in water. In contrast, untreated paper and paper treated only with the phenol-formaldehyde resin wet readily when dipped in water. The phenol-formaldehyde resin employed is prepared by condensing 1 mole of phenol with 1.5 mole of formaldehyde in the presence of sulfuric acid as a catalyst and terminating the reaction in the A-stage.

EXAMPLE II

Example I is repeated except that the polyisocyanate was applied as a 0.5% by weight aqueous emulsion. Substantially the same fine results are obtained.

EXAMPLE III

Example II is repeated except that the phenolformaldehyde resin is first applied, the impregnated paper is dried, the aqueous emulsion of the polyisocyanate is applied and then the paper is cured at 150° C. Again substantially the same fine results are obtained.

EXAMPLE IV

Example I is repeated using a 1.5% by weight solution of the polyisocyanate in combination with the diketimine prepared from dipropylene triamine and methyl isobutyl ketone (weight ratio of polyisocyanate to diketimine is 30:9.8). Again the filter paper has excellent water repellency and strength but is readily wet by mineral oil.

It is to be understood that the invention is not to be limited to the exact details of operation or the exact compositions shown or described, as obvious modifications and equivalents will be apparent to those skilled in the art.

The embodiments of the invention in which an exclusive property or privilege is claimed are defined as follows:

1. The process of preparing treated oil filter paper which comprises: (A) impregnating filter paper with (1) a thermosetting phenol-formaldehyde resin in an amount sufficient to substantially increase the wet strength of the paper; (B) impregnating the paper with (2) a polyisocyanate or a combination of a polyisocyanate and a polyamine in an amount sufficient to substantially increase the water repellency of the paper, said polyisocyanate having the formula

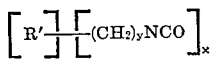

where y is 0 or 1, x is an integer of 2 to about 4 and R' is the hydrocarbon group of polymeric fat acids; (C) curing the phenolformaldehyde resin impregnated paper; and (D) curing the polyisocyanate or polyisocyanate-polyamine impregnated paper, said impregnation and curing (A) through (D) being completed in any order with the provisos that impregnation (A) must be completed before curing (C), that impregnation (B) must be completed before curing (D) and that curing (C) and (D) can be completed simultaneously.

2. The process of claim 1 wherein the polyisocyanate (2) has the formula

OCN—CH$_2$—D—CH$_2$—NCO where D is the divalent hydrocarbon radical of a dimerized fat acid.

3. The process of claim 1 wherein the impregnation (A) is carried out using an alcoholic solution of the thermosetting phenol-formaldehyde resin (1).

4. The process of claim 1 wherein the paper is impregnated (A) with about 5 to 40% by weight of the thermosetting phenol-formaldehyde resin based on the dry weight of the paper.

5. The process of claim 1 wherein the paper is impregnated (C) with about 0.5 to 25% by weight of the polyisocyanate or polyisocyanate-polyamine combination (2) based on the dry weight of the paper.

6. The process of claim 1 wherein the weight ratio of the polyamine to the polyisocyanate is in the range of 5:100 to 100:5.

7. The process of claim 6 wherein the polyamine is an alkylene polyamine.

8. The process of claim 1 wherein the impregnation (B) is carried out using an organic solvent solution of the polyisocyanate (2).

9. The process of claim 1 wherein the impregnation (B) is carried out using an aqueous emulsion of the polyisocyanate (2).

10. The process of claim 1 wherein the curing (C) is carried out by heating the impregnated paper to a temperature of 125 to 250° C.

11. The process of claim 1 wherein the impregnation (A) is carried out using an alcoholic solution of the thermsetting phenol-formaldehyde resin (1), the thermosetting phenol-formaldehyde resin (1) is used in an amount of about 5 to 40% by weight based on the dry weight of the paper, the impregnation (B) is carried out using a polyisocyanate (2) of the formula

OCN—CH$_2$—D—CH$_2$—NCO where D is the divalent hydrocarbon radical of a dimerized fat acid prepared by polymerizing a monobasic aliphatic carboxylic acid of 8 to 24 carbon atoms, the polyisocyanate (2) is used in an amount of about 0.5 to 25% by weight based on the dry weight of the paper, the curing (C) is carried out by heating the impregnated paper to a temperature of 125 to 250° C. and the curing (C) and (D) are completed simultaneously.

12. The treated oil filter paper prepared by the process of claim 1.

13. The treated oil filter paper prepared by the process of claim 11.

References Cited

UNITED STATES PATENTS

| 2,284,895 | 6/1942 | Hanford | 8—120 |
| 2,446,864 | 8/1948 | Abrams | 117—135.5 |
| 2,579,984 | 12/1951 | Towbridge | 55—524 |
| 2,893,898 | 7/1959 | Evans | 117—155 X |
| 2,897,094 | 7/1959 | Hayes | 117—62.1 |
| 3,174,625 | 4/1965 | Briggs | 55—524 X |
| 3,201,924 | 8/1965 | Fulford | 55—524 X |

FOREIGN PATENTS 579,340   7/1946   Great Britain.

WILLIAM D. MARTIN, Primary Examiner
W. R. TRENOR, Assistant Examiner

U.S. Cl. X.R.

717—76; 55—524